United States Patent [19]
Simkowski

[11] Patent Number: 5,819,907
[45] Date of Patent: Oct. 13, 1998

[54] APPARATUS AND METHOD FOR CONVEYING DIFFERENT TYPES OF FORCE RESPONSIVE ARTICLES

[75] Inventor: Donald J. Simkowski, Loveland, Colo.

[73] Assignee: Goldco Industries, Inc., Loveland, Colo.

[21] Appl. No.: 679,586

[22] Filed: Jul. 15, 1996

[51] Int. Cl.[6] .................................................. B65G 17/46
[52] U.S. Cl. .................................... 198/689.1; 198/690.1
[58] Field of Search ............................ 198/688.1, 689.1, 198/690.1

[56] References Cited

U.S. PATENT DOCUMENTS

| | | | |
|---|---|---|---|
| 3,603,448 | 9/1971 | Okano et al. | 198/689.1 |
| 3,802,699 | 4/1974 | Wiig et al. | |
| 4,406,359 | 9/1983 | Cole et al. | 198/689.1 X |
| 4,773,522 | 9/1988 | Lenhart | 198/689.1 X |
| 5,158,169 | 10/1992 | Hardman | 198/690.1 |
| 5,373,933 | 12/1994 | Planke et al. | 198/689.1 |
| 5,423,410 | 6/1995 | Keller et al. | 198/406 |
| 5,680,922 | 10/1997 | Bessels | 198/690.1 X |

*Primary Examiner*—James R. Bidwell
*Attorney, Agent, or Firm*—Robert E. Harris

[57] ABSTRACT

Apparatus and method are disclosed for conveying different types of force responsive articles, such as steel and aluminum cans, and particularly for efficiently conveying different force responsive articles between first and second positions, including positions at different elevations. A conveyor, such as a chain, moves the articles along a predetermined path between the first and second positions with the articles maintained in engagement during movement along the predetermined path and with the conveyor using different applied forces for different ones of the types of articles to be conveyed, such as a magnetic force for conveying steel cans and a negative pressure (vacuum) force for conveying aluminum cans. A support face for the conveyor has magnets mounted thereat to establish the magnetic force and apertures communicating with an adjacent plenum to establish the negative pressure force. The applied force is tapered near the ends of the conveyor, preferably using shorting bars, and a bar placement pattern for applied force adjustment is utilized to facilitate article movement onto and/or from the conveyor.

29 Claims, 5 Drawing Sheets

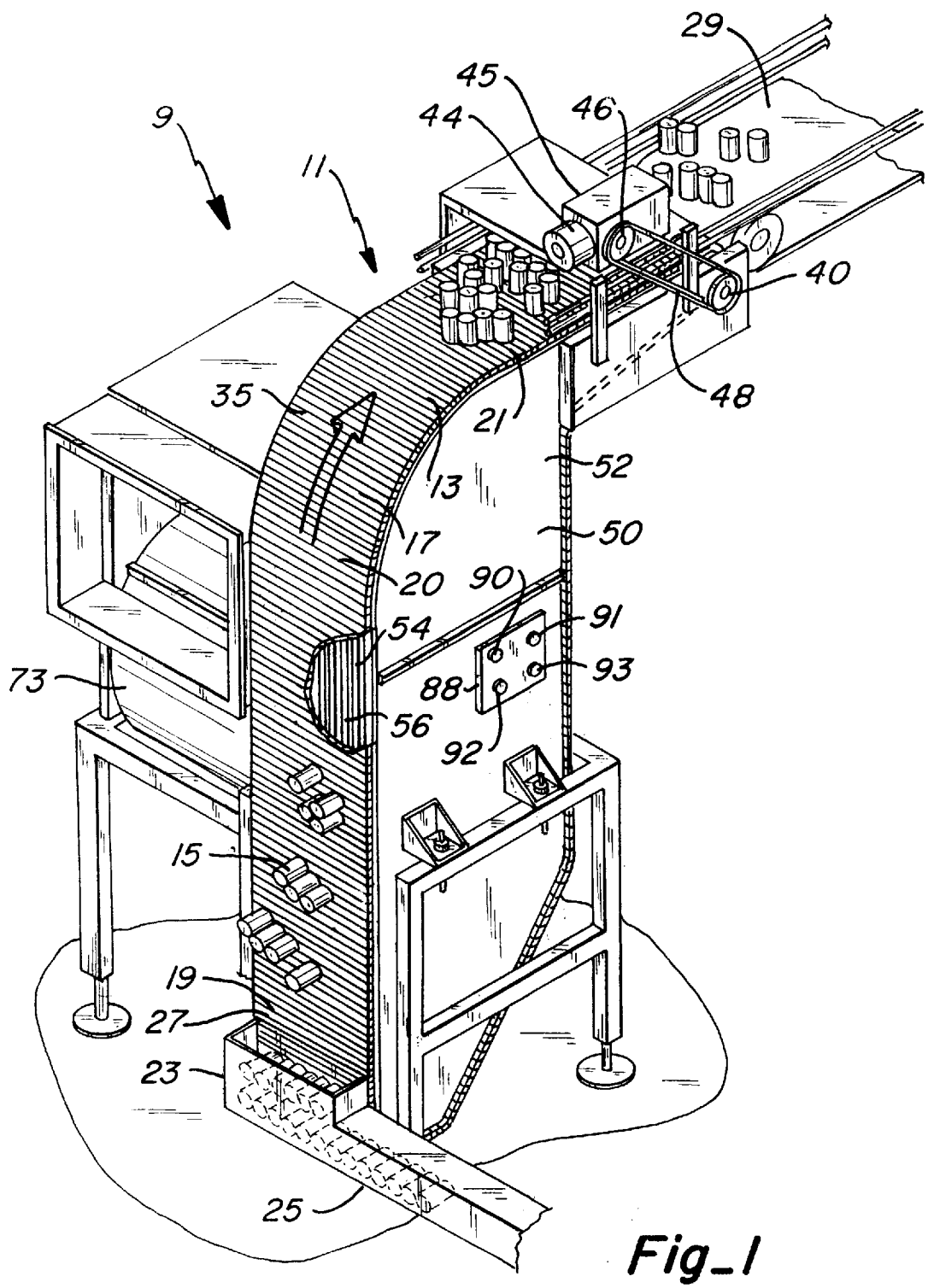
Fig_1

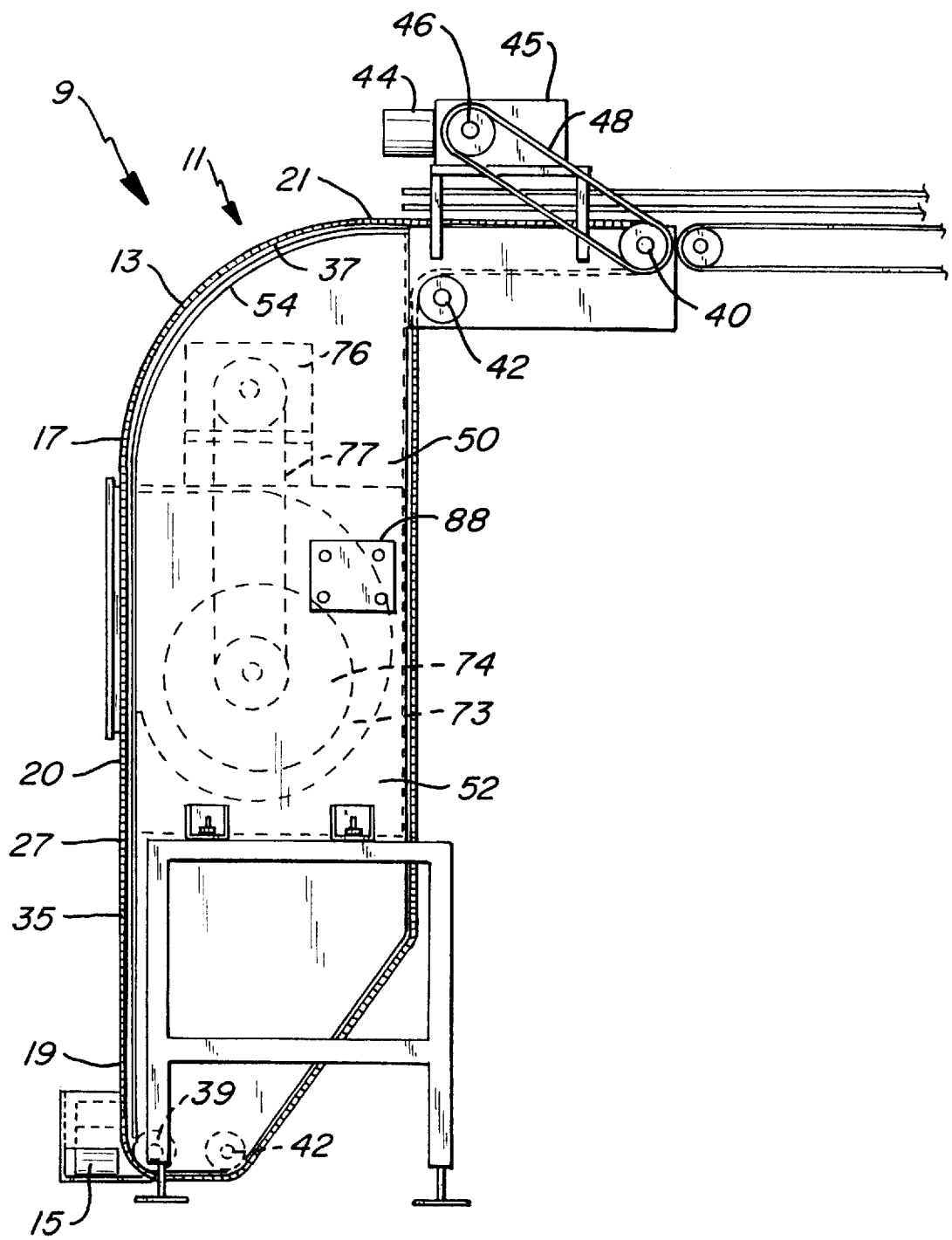
Fig_2

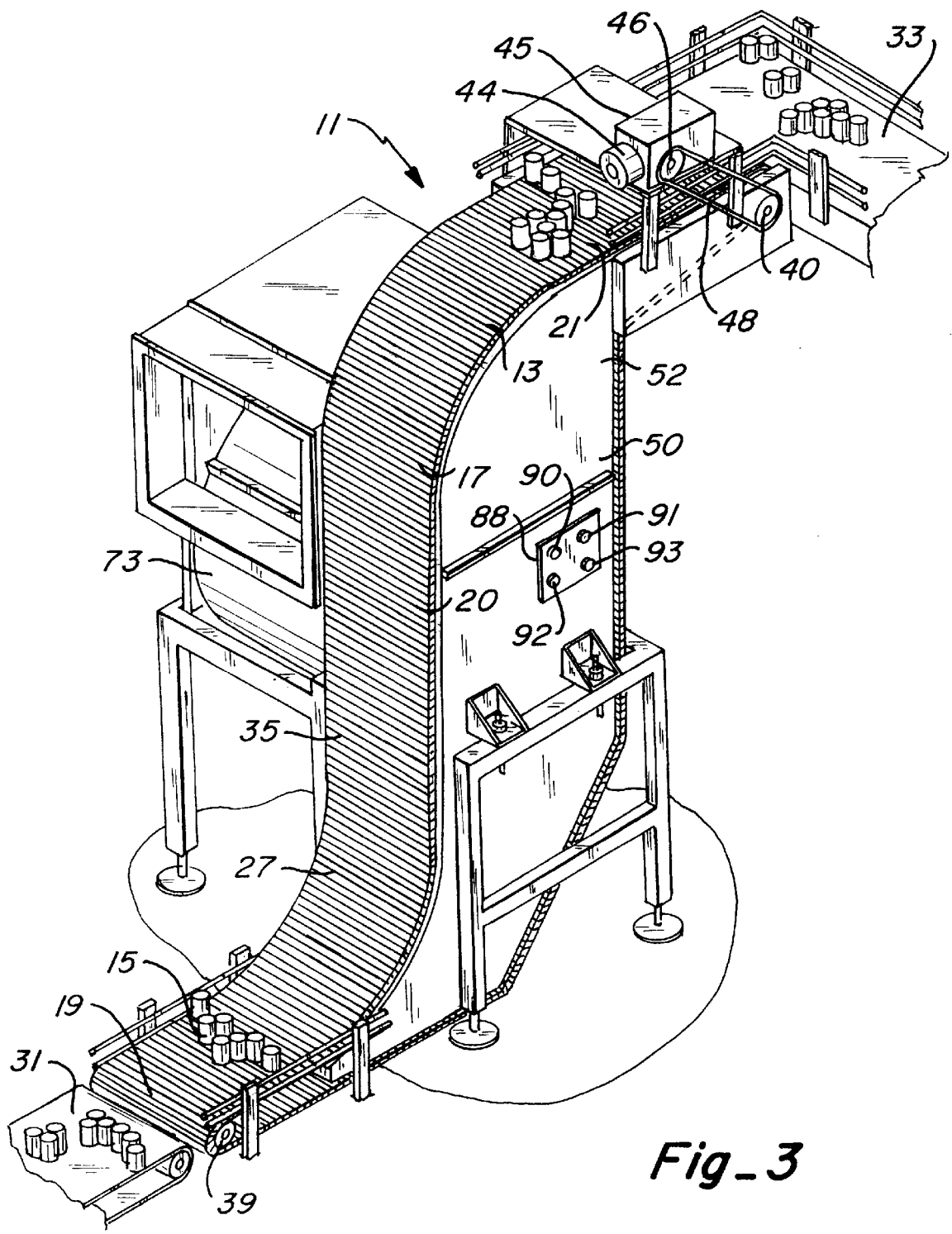
Fig_3

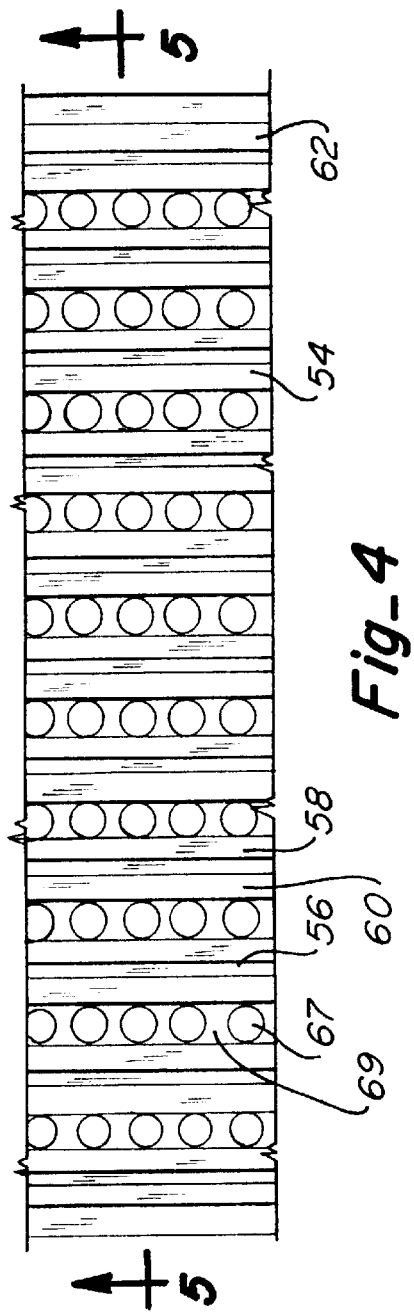
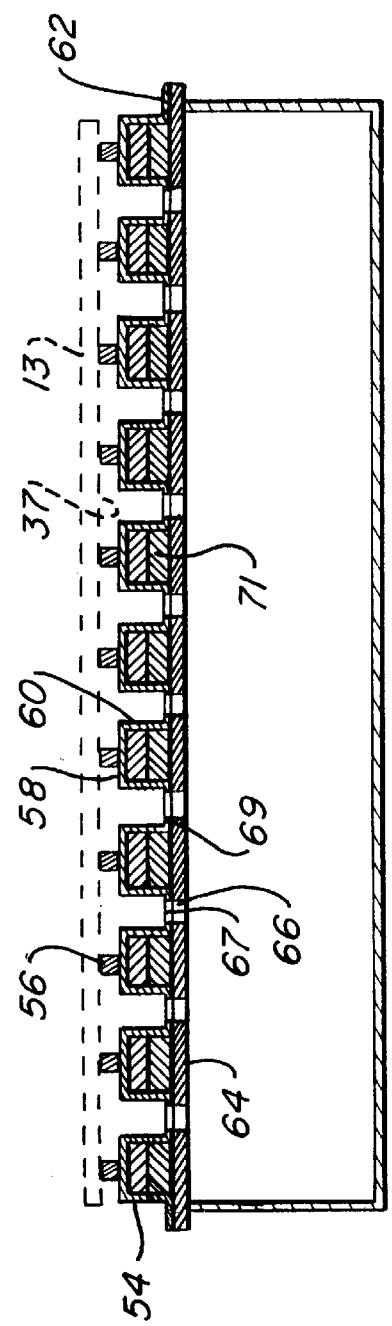

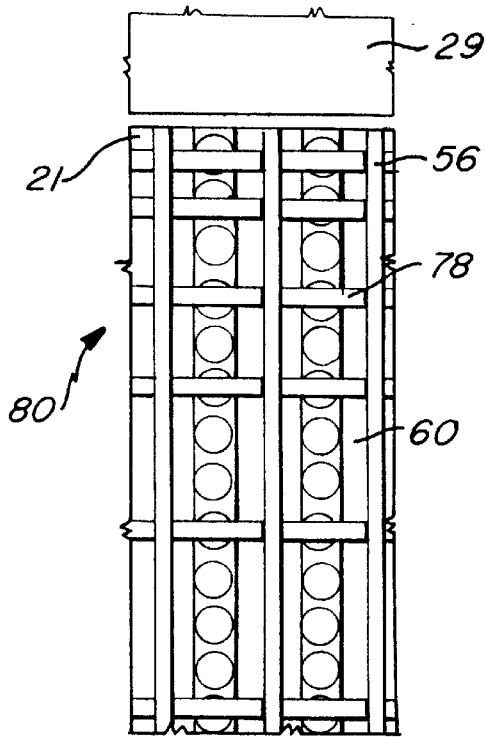
Fig_6
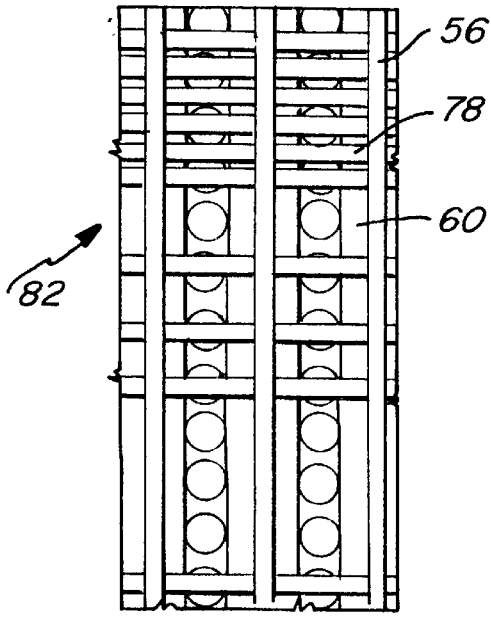
Fig_7
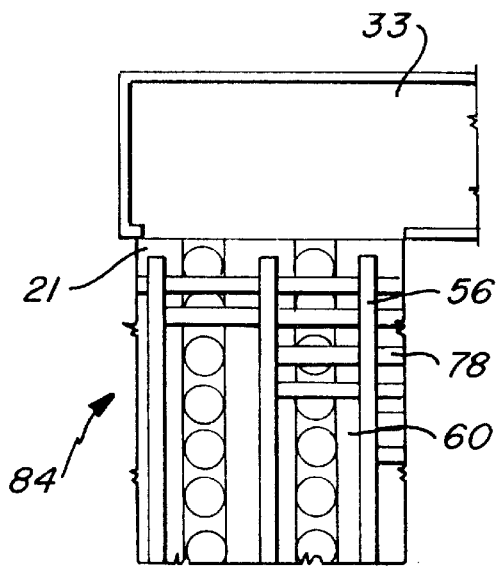
Fig_8
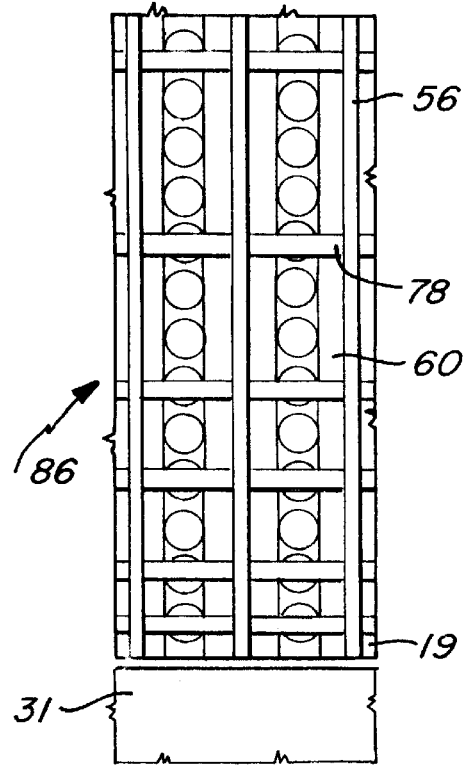
Fig_9

APPARATUS AND METHOD FOR CONVEYING DIFFERENT TYPES OF FORCE RESPONSIVE ARTICLES

FIELD OF THE INVENTION

This invention relates to an article conveying apparatus and method, and, more particularly, relates to an apparatus and method for conveying different types of force responsive articles.

BACKGROUND OF THE INVENTION

It is now well known that articles, such as cans, may be effectively mass transported from one position to another using various forms of conveying equipment, including moving belts or chains and the like, to move the articles along a generally horizontal path.

Mass transport of articles along a path that is angled with respect to horizontal utilizing conveying apparatus has also been heretofore suggested and/or utilized, and normally such conveying apparatus has included some form of restraining unit, such as, for example, using negative pressure and/or a positive holding structure (see, for example, U.S. Pat. No. 3,603,448 to Okano et al. and U.S. Pat. No. 4,406,359 to Cole et al.), or a magnetic force (see, for example, U.S. Pat. No. 5,158,169 to Hardman and U.S. Pat. No. 5,423,410 to Keller et al.) to assure that the articles, such as cans, are maintained in contact, or engagement, with the conveyor while being moved, and it has also been suggested that the applied force be tapered adjacent to an end of the conveyor (see, for example, U.S. Pat. No. 5,423,410 to Keller et al.)

However, while a conveyor has been heretofore suggested and/or utilized for conveying articles, such as cans, with the apparatus including an applied force, that can be either negative pressure or magnetic, to maintain the articles in engagement with the conveyor, such now known conveying apparatus has not been found capable of efficiently conveying different types of force responsive articles using different forces dependent upon the type of article then to be conveyed, as, for example, where the different types of articles are steel and aluminum cans.

While presently known conveying apparatus can convey articles, including both aluminum and steel cans, in mass with the articles maintained in engagement with a conveyor using negative pressure as the applied force, such apparatus necessarily requires a motor having relatively high horsepower to establish adequate negative pressure to maintain engagement of all of the types of articles to be conveyed with the conveyor. For conveying steel cans, a higher horsepower motor is required than would be necessary for conveying lighter aluminum cans (a 50 HP motor, for example, has been found necessary for maintaining can/conveyor engagement when conveying steel cans, whereas a 30 HP motor has been found to be adequate for maintaining can/conveyor engagement when conveying aluminum cans under the same conditions).

Thus, by eliminating the need for a higher horsepower motor, as can be achieved by use of a different applied force for conveying steel cans (i.e., a magnetic force that requires no electric motor), considerable operational savings can be realized using a conveying apparatus capable of providing a negative pressure force established with a relatively low horsepower electric motor for maintaining can/conveyor engagement during conveying of aluminum cans and using a magnetic force that requires no electric motor for maintaining can/conveyor engagement during conveying of steel cans, as has been efficiently achieved in this invention.

SUMMARY OF THE INVENTION

This invention provides apparatus and method for efficiently conveying different types of force responsive articles, such as steel and aluminum cans, from a first position to a second position, which positions may be at different elevations.

A conveying unit, having a movable conveyor, such as a chain, effects movement of the articles along a predetermined path between the first and second positions with the articles maintained in engagement with the conveyor during movement along the predetermined path. Different applied forces maintain engagement of the different types of force responsive articles with the conveyor, such as, a magnetic force is utilized during conveying of steel cans and a negative pressure force (vacuum) is utilized during conveying of aluminum cans.

A support face for the conveyor preferably has the different applied forces thereat, including magnets mounted at the support face for establishing a magnetic force and apertures in the support face communicating with an adjacent plenum for establishing a negative pressure force.

Tapering of the applied force is preferably effected near the opposite ends of the conveyor, preferably by use of shorting units, such as shorting bars, with a placement pattern of the shorting units being selected according to the type of articles to be then received at and/or discharged from the conveyor.

It is therefore an object of this invention to provide novel apparatus and method for conveying different types of force responsive articles.

It is another object of this invention to provide novel apparatus and method for efficiently conveying different types of force responsive articles, such as aluminum and steel cans.

It is still another object of this invention to provide novel apparatus and method for efficiently conveying articles between different elevations.

It is still another object of this invention to provide novel apparatus and method for conveying different types of articles on a conveyor with the articles being maintained in engagement with the conveyor using different forces based upon the type of articles then to be conveyed.

It is still another object of this invention to provide novel apparatus and method for efficiently conveying different types of articles from a first position to a second position using a conveyor for engaging the articles and different applied forces depending upon the type of articles then to be conveyed for maintaining engagement of the articles with the conveyor during movement of the articles.

It is still another object of this invention to provide novel apparatus and method for conveying different types of force responsive articles using negative pressure and magnetic forces depending upon the type of article to be then conveyed for maintaining the articles in engagement with a conveyor during conveying of the articles.

It is still another object of this invention to provide novel apparatus and method for conveying different types of force responsive articles using a support face for supporting a conveyor and having first and second force providers providing different forces at the support face.

It is still another object of this invention to provide novel apparatus and method for conveying different types of articles from a first position to a second position using a conveyor for engaging the articles and different applied forces depending upon the type of articles then to be conveyed with the applied force being tapered adjacent to at least one of input and output positions of the conveyor to maintain the articles in engagement with the conveyor and facilitate insertion and/or removal of articles to and from the conveyor.

With these and other objects in view, which will become apparent to one skilled in the art as the description proceeds, this invention resides in the novel construction, combination, arrangement of parts and method substantially as hereinafter described, and more particularly defined by the appended claims, it being understood that changes in the precise embodiment of the herein disclosed invention are meant to be included as come within the scope of the claims.

BRIEF DESCRIPTION OF THE DRAWINGS

The accompanying drawings illustrate complete embodiments of the invention according to the best mode so far devised for the practical application of the principles thereof, and in which:

FIG. 1 is a perspective view of an apparatus according to this invention for efficiently conveying different types of force responsive articles;

FIG. 2 is a side view of the apparatus shown in FIG. 1;

FIG. 3 is a perspective view of an alternate embodiment of the apparatus shown in FIG. 1;

FIG. 4 is a partial top view illustrating a portion of the conveyor (chain) engaging face of the apparatus as shown in FIG. 1;

FIG. 5 is a cross-section view taken through lines 5—5 of FIG. 4; and

FIGS. 6 through 9 are partial top views illustrating the patterned use of shorting bars in the conveyor support face for force tapering at the discharge and input end portions of the conveyors as shown in FIGS. 1 and 3.

DESCRIPTION OF THE INVENTION

Apparatus 9 according to this invention includes, as best shown in FIGS. 1 and 2, a conveying unit, 11 having a conveyor, such as a chain, 13 for effecting movement of articles, such as cans, 15 along a predetermined path 17 from a first, or input, end portion 19 through a central, or main, portion 20 to a second, or discharge, end portion 21. As also shown in FIGS. 1 AND 2, central portion 20 of conveyor 13 is substantially vertically positioned to convey articles 15 upwardly from vertically positioned input, or infeed, end portion 19, and discharge end portion 21 is curved to extend substantially horizontal at the termination of the end portion for discharge of articles from the conveyor.

Articles, such as cans, 15 are provided to input end portion 19 of conveyor 13, and, as indicated in FIG. 1 the articles (cans) 15 are provided to vertical input end portion 19 by means of conventional can feed, or input, unit 23.

As indicated for the conventional can infeed arrangement illustrated in FIG. 1, cans to be supplied to conveyor 13 are fed in single file through chute 25, extending normal to the conveyor, and deposited along the front face, or surface, 27 of the conveyor at input end portion 19 thereof near the termination of the input end portion. As is conventional for this type of can infeed, the cans are usually urged along the chute by means of air or magnetic force and are deposited with an end of each of the cans in engagement with surface 27 of the conveyor and with the cans being deposited across the entire width of surface 27 of the conveyor usually, but not necessarily, in rows.

While cans having the open top facing toward the conveyor are specifically shown in the drawings, it is meant to be realized that the articles may also be conveyed with the open top facing away from the conveyor if necessary or desired. While only a few articles (cans) have been shown in the drawings, it is also meant to be realized that the entire outer surface 27 of the conveyor would ordinarily be filled with articles during normal operation.

As indicated in FIGS. 1 and 2, articles, such as cans, discharged from conveyor 13 at discharge end portion 21 are usually supplied to a conventional discharge conveyor, such as discharge conveyor 29, shown in FIGS. 1 and 2 to extend straight outwardly from discharge end portion 21 so that no angular deviation occurs in the path of articles discharged from the conveyor.

This invention is, however, not meant to be limited to a particular infeed or discharge arrangement, and other conventional infeed and/or discharge arrangements may also be utilized, with or without modification of the input and/or discharge end portions of the conveyor, so long as the articles, such as cans, are adequately provided to the conveyor with the selected end of the cans engaging the surface of the conveyor, and with the cans being discharged and adequately carried away for the conveyor to prevent jamming at the discharge end of the conveyor.

As indicated in the alternate embodiment of the conveyor unit, as shown in FIG. 3, conveyor 13 may, for example, still have the main portion 20 extending substantially vertically (it is to be realized, however, that the main portion could be inclined at an angle with respect to horizontal) but, as shown, have both the input and output end portions 19 and 21 curved from main portion 20 to extend horizontally (or nearly horizontally) to receive articles, such as cans, at input end portion 19 of the conveyor and to discharge articles, such as cans, at discharge end portion 21 of the conveyor.

As is particularly shown in the alternate embodiment of FIG. 3 by way of example, horizontally extending input end portion 19 can receive articles from conventional input conveyor 31 with no angular deviation in the path of articles delivered, or supplied, to input end portion 19 of the conveyor. As also indicated in FIG. 3 by way of further example, conventional discharge conveyor 33 may be positioned normal to output end portion 19 of the conveyor so that articles discharged from discharge end portion 21 of the conveyor have a path deviation of ninety degrees in moving from the discharge end portion of the conveyor to normally positioned discharge conveyor 33.

While the device of this invention is particularly useful for conveying articles between first and second positions at different elevations, as is indicated in FIGS. 1 through 3, it is also to be realized that input, conveying and discharge of articles could be on a common horizontal plane so that the articles are conveyed at the same elevation from input end portion 19 to discharge end portion 21, main conveying portion 20 could have a curvature, and/or the input and discharge end portions could be reversed if the articles are to be brought to a lower elevation, without departing from the intended scope of this invention.

Predetermined article path 17 for conveying of articles is established above and adjacent to outer surface, or face, 27 of conveyor 13, and path 17 extends from and along article input end portion 19 to article discharge end portion 21. Conveyor 13 is magnetically non-responsive and has openings 35 therein (and is preferably a magnetically non-responsive chain with openings therein provided by spaced links or the like) extending through the conveyor between front outer face, or surface, 27 and inner rear face, or surface, 37 (a chain with spaced links is shown in the drawings but other types of movable units might also be used as the conveyor so long as the movable unit utilized is magnetically non-responsive).

Openings 35 in conveyor 13 are smaller in size than are the articles to be conveyed (and are, for example, smaller at least in width than are the diameter of articles to be conveyed, such as cans), with openings 35 being sufficiently close to one another so that at least one opening is under each article conveyed along predetermined path 17. This ensures that, when the apparatus is operated with negative fluid pressure (vacuum) present at the surface of the conveyor opposite to the surface having the articles positioned thereon, the articles are drawn toward and maintained in engagement with the conveyor as the articles are moved along the predetermined path by the conveyor.

Conveyor 13 preferably has sufficient width between the longitudinally spaced opposite edge portions to accommodate a plurality of widthwise spaced articles as is common for mass conveying, or transport, of articles, and, as best shown in FIG. 2, conveyor 13 is preferably an endless chain that extends around sprockets 39 and 40 at input and discharge sections 19 and 21, respectively, with a plurality of additional sprockets, or rollers, 42 being spaced along the chain as needed. Chain 13 is preferably driven about an endless path by electric motor 44 through reduction unit 45 and drive sprocket 46 and drive chain, or belt, 48 extending between drive sprocket 46 and discharge end sprocket 40 so that rotation of sprocket 40 causes chain 13 to be driven about the endless path at a speed, for example, of about 45 feet per minute.

Chamber, or plenum, 50, as best shown in FIGS. 1 and 2, includes housing 52 and support, or front, face 54, with support face 54 extending along and adjacent to inner surface 37 of conveyor 13 (and hence the conveyor is contiguous to and between support face 54 and predetermined path 17). Plenum 50 is normally an air plenum that is maintained, during normal operation when the negative pressure force is being utilized, at a negative fluid (air) pressure sufficient to draw articles in predetermined path 17 against conveyor 13 and thereafter maintain engagement of the articles with conveyor 13 during movement of the articles along the predetermined path (about two and one-half inches of water has proved to be sufficient with articles, such as aluminum cans, and about four inches of water has proved to be sufficient with articles such as steel cans).

Support face 54, as best shown in FIGS. 4 and 5, extends along predetermined path 17 with chain 13 between path 17 and support face 54 when the conveyor is a chain, as is now preferred. Support face 54 includes a plurality of elongated, magnetically responsive, metallic rods (preferably cold rolled mild steel one-fourth inch square key stock) 56 spaced longitudinally from one another about one and three-fourth inches (1.75") across the width of conveyor 13 with the rods extending along the length of the conveyor so that rods 56 engage inner side 37 of the chain opposite to that in engagement with the articles being transported along predetermined path 17 (rods 56 thus form wear strips for the conveyor and also establish the angle, if any, and/or the curvature, if any, in predetermined article path 17).

As best shown in FIG. 5, rods, or support elements, 56 are centrally mounted on the top surface 58 of each of inverted, lengthwise extending channels forming magnet covers 60. As indicated in the drawings, a sheet 62 of stainless steel having a sufficient width to form the needed plurality of magnet covers 60 is preferably utilized, and sheet 62 with magnet covers 60 formed therein is preferably mounted on magnetically responsive, metallic backing, or mounting, plate (preferably mild steel) 64 (using bolts, for example, to fasten sheet 62 to backing plate 64). Sheet 62 and backing plate 64 are of sufficient size to extend over plenum 50 and cover the entire portion of plenum 50 that is adjacent to conveyor 13, and rods 56 space conveyor 13 away from magnet covers 60 to allow for sufficient air flow to establish the negative pressure force.

As best shown in FIGS. 4 and 5, openings, or apertures, 66 are provided through backing plate 64 and these apertures are aligned with like apertures 67 in valleys 69 of sheet 62 between magnet covers 60 to allow establishment of negative pressure by pulling air from between the articles on predetermined path 17 and the adjacent conveyor into plenum 50 through the apertures in sheet 62 and backing plate 64, when negative pressure is used as the applied force, to maintain the articles on predetermined path 17 in engagement with the conveyor.

As best shown in FIG. 5, magnets 71 (preferably calculated mass permanent magnets, which magnets may be, for example, double thick permanent magnets) are mounted on backing plate 64 and positioned within the lengthwise extending channels forming magnet covers 60, and the magnets are positioned within the channels so that the magnets are oriented north–south–north–south entirely across the width of support face 54. When so positioned, a magnetic force is established for maintaining magnetically responsive articles against the conveyor while being moved by the conveyor along the predetermined path.

Negative fluid pressure is established in plenum 50 by means of pressure source 73, best shown in FIGS. 1 and 2 to include a fan, or blower, 74. Fan 74 is rotatively driven by electric motor 76 and drive belt, or chain, 77, so that, when in operation, fan 74 causes air to be drawn from the area between the articles in the predetermined path and conveyor 13 to establish negative pressure therebetween sufficient to maintain engagement between the articles and the conveyor.

To accommodate transfer of articles to and from conveyor 13, it is advantageous to provide tapering of the applied force being utilized to maintain engagement between the conveyor and the articles being conveyed. When negative pressure is being utilized as the applied force, tapering can be achieved by blocking, or adjusting, air flow through the apertures in support face 54 and backing plate 64, and when a magnetic force is used as the applied force, tapering can be achieved by blocking, or adjusting, the magnetic force.

While tapering of a magnetic force has heretofore been achieved by shaping permanent magnets (i.e., by cutting the magnets at an angle), this is both expensive and difficult to accomplish with repeatable like results. While it is also possible to achieve tapering of magnetic forces through use of electromagnets and electrically controlling operation of such magnets, this is also expensive as well as presenting difficulty in implementation, at least in some cases.

Tapering of applied forces is achieved herein using shorting units 78, such as shorting bars, which may, for example, be short, magnetically responsive, metallic rods having a structure like that of rods 56. Shorting units 78 are positioned between rods 56 (and hence spanning valleys 69) with the shorting units in contact with magnet covers 60 and/or rods 56 adjacent to input end portion 19 and/or at discharge end portion 21 of conveyor 13, as indicated in FIGS. 6 through 9, to short out the magnetic circuit at the immediate area and thereby reduce the magnetic field above the adjacent portion of the conveyor (shorting units 78 may also be used, for example, to block air passage to thereby regulate, or adjust, negative pressure in the adjacent area above the conveyor).

By use of shorting units 78 that are removably positioned in a spaced arrangement, tapering of an applied force can be patterned for a particular use. As shown by way of example in FIG. 6, a pattern 80 may be effectively utilized to progressively weaken the applied force in the direction toward the termination of discharge end portion 21 to accommodate discharging of articles from the discharge end of the conveyor with no deviation in the path of articles discharged from the conveyor onto associated discharge conveyor 29, as is shown in FIG. 1.

As shown by way of further example in FIG. 7, a pattern 82 may be effectively utilized to completely and then partially block application of the applied force where the articles must slide across the face of the conveyor at input end portion 19 before being drawn into engagement with the conveyor for transport along the predetermined path, as is also shown in FIG. 1.

As shown by way of still further example in FIG. 8, a pattern 84 may be effectively utilized to progressively weaken the applied force in the direction toward the termination of discharge end portion 21 of the conveyor with the progressive weakening of the applied force being at an angle with respect to the intended path of articles along the predetermined path at the discharge end portion of the conveyor where the path of the articles discharged from the conveyor is deviated when the articles are conveyed onto an associated discharge conveyor, such as discharge conveyor 33 positioned normal to output end portion 21 of conveyor 13, as is shown in FIG. 3.

Finally, as shown by way of still further example in FIG. 9, a pattern 86, similar to (or like) the pattern 80 shown in FIG. 6, may be effectively utilized to progressively strengthen the applied force in the direction away from the termination of input end portion 19 of the conveyor to accommodate receiving the articles at the input end portion of the conveyor with no deviation in the path from associated input conveyor 31, as is also shown in FIG. 3.

Control of the effective applied force and the various associated conveyors may be provided by electrical switches at control unit 88. Electrical switch 90 controls energization of electric motor 44 (driving conveyor 13), electrical switch 91 controls energization of electric motor 76 (driving fan 74 to establish negative pressure), and electrical switches 92 and 93 control operation of the associated conveying units supplying articles to the conveyor and removing articles discharged from the conveyor. Since permanent magnets are used, the magnetic force is constantly present (the use of electromagnets could require use of an electrical switch to selectively apply the magnetic force, but permanent magnets have been found to be preferable for use in this invention).

For operation of apparatus according to this invention, the type of article to be then conveyed is determined, the effective applied force for the type of article to be conveyed is selected, tapering patterns are adjusted (if the articles are to be received or discharged in a different manner), and negative pressure is established or precluded (depending upon the determined type of articles to be then conveyed).

For conveyance of aluminum cans, for example, negative pressure is needed as the applied force to maintain engagement of the aluminum cans with the conveyor, and this force is therefore established when this type of can is being conveyed, while for conveying of steel cans, for example, no negative pressure is utilized as the applied force (the applied force utilized is the magnetic force established by the permanent magnets to maintain engagement of the steel cans with the conveyor).

Since the negative pressure force need not be as great to maintain aluminum cans in engagement with the conveyor (as compared to a negative pressure force that would be required to maintain steel cans in engagement with the conveyor), a smaller motor can be, and is, used to establish the negative pressure force, and since no negative pressure force is needed (and hence no electric motor is needed) when the magnetic force can be utilized, considerable operational savings are realized using this invention.

As can be appreciated from the foregoing, this invention thus provides novel apparatus and method for conveying different types of force responsive articles.

What is claimed is:

1. An article conveying apparatus for conveying different types of force responsive articles, said apparatus comprising:
    a conveyor for receiving the articles to be conveyed and for effecting movement of the articles along a predetermined path by movement of said conveyor with the articles in engagement therewith, said conveyor having a width sufficient to enable at least some of the received articles on said predetermined path to be widthwise spaced from others of the received articles on said predetermined path;
    a first force provider adjacent to said conveyor, said first force provider providing a first force capable, when applied, of acting upon received articles of a first one of the different types of articles on said predetermined path to maintain the received articles of said first one of the different types of articles in engagement with said conveyor regardless of said widthwise spacing of the received articles on said conveyor; and
    a second force provider adjacent to said conveyor, said second force provider providing a second force different in type from that of said first force and capable, when applied, of acting upon received articles of a second one of the different types of articles on said predetermined path to maintain the received articles of said second one of the different types of articles in engagement with said conveyor regardless of said widthwise spacing of the received articles on said conveyor.

2. The apparatus of claim 1 wherein the types of articles to be conveyed are steel and aluminum cans.

3. The apparatus of claim 1 wherein said first force is a magnetic force, and wherein said second force is a negative pressure source.

4. The apparatus of claim 3 wherein said first force provider includes a plurality of magnets.

5. The apparatus of claim 4 wherein said plurality of magnets are permanent magnets.

6. The apparatus of claim 3 wherein said conveyor has openings therein, and wherein said second force provider includes a plenum into which fluid is drawn through said openings in said conveyor.

7. An article conveying apparatus for conveying different types of force responsive articles, said apparatus comprising:
    a conveyor for effecting movement of the articles along an article path by movement of said conveyor along an adjacent conveyor path with the articles in engagement with said conveyor;
    a support face contiguous to said conveyor, said support face including a plurality of support elements engagable with said conveyor to establish said conveyor path;

a first force provider adjacent to said support face and spaced from said conveyor path, said first force provider providing a first force capable, when applied, of acting upon articles of a first one of the different types of articles to maintain the articles of said first one of the different types of articles on said article path in engagement with said conveyor; and a second force provider adjacent to said support face and spaced from said conveyor path, said second force provider providing a second force different in type from that of said first force and capable, when applied, of acting upon articles of a second one of the different types of articles to maintain the articles of said second one of the different types of articles on said article path in engagement with said conveyor.

8. The apparatus of claim 7 wherein said first force provider includes a plurality of magnets positioned adjacent to said support face to provide a magnetic force as said first force, wherein said support face includes a plurality of apertures therein, and wherein said second force provider includes a plenum communicating with said apertures in said support face to provide a negative force as said second force.

9. The apparatus of claim 8 wherein said conveyor has openings therein, wherein said support elements of said support face are spaced rods, and wherein said first force provider includes a cover engagable with said rods and a mounting plate for said plurality of magnets.

10. The apparatus of claim 1 wherein said apparatus includes a controller for causing an effective one of said first and second forces to be applied to the type of articles to be then conveyed to cause the articles to be maintained in engagement with said conveyor during movement of the articles along said predetermined path, wherein said first force is constantly present during operation of said apparatus, and wherein said controller precludes said second force from being applied when the first one of the different types of articles is to be then conveyed and allows said second force to be applied when the second one of the different types of articles is to be then conveyed.

11. The apparatus of claim 10 wherein the first and second ones of the different types of articles are steel and aluminum cans, wherein said first force is a magnetic force, and wherein said second force is a negative pressure source whereby said controller causes said magnetic force to be the effective applied force when steel cans are to be conveyed and causes said negative pressure force to be the effective applied force when aluminum cans are to be conveyed.

12. The apparatus of claim 1 wherein said apparatus is capable of conveying articles along said predetermined path between different elevations.

13. An article conveying apparatus for mass conveying steel and aluminum cans, said apparatus comprising:

a conveyor for effecting mass movement of the cans along a predetermined path between first and second positions;

a first force provider adjacent to said conveyor, said first force provider providing a magnetic force capable, when applied, of acting upon steel cans on said predetermined path to thereby cause the steel cans to be maintained in engagement with said conveyor during movement of the steel cans from said first position to said second position regardless of the positioning of the steel cans on said conveyor; and a second force provider adjacent to said conveyor, said second force provider providing a negative pressure force capable, when applied, of acting upon aluminum cans on said predetermined path to thereby cause the aluminum cans to be maintained in engagement with said conveyor during movement of the aluminum cans from said first position to said second position regardless of the positioning of the aluminum cans on said conveyor.

14. The apparatus of claim 13 wherein said apparatus is an elevator for conveying articles from said first position to said second position with said first and second positions being at different elevations.

15. The apparatus of claim 13 wherein said conveyor has openings therein, wherein said first force provider includes a plurality of magnets to establish said magnetic force, and wherein said second force provider includes an air plenum for establishing negative pressure between the articles and said conveyor by drawing air through said openings in said conveyor.

16. The apparatus of claim 15 wherein said apparatus includes a support face between said conveyor and said air plenum.

17. The apparatus of claim 16 wherein said support face includes a plurality of elongated and spaced rods engagable with said conveyor, a cover sheet having a plurality of elongated and spaced channels therein for positioning said plurality of magnets therein, and a plurality of apertures between said channels and communicating with said air plenum for establishing said negative pressure between said conveyor and the articles.

18. The apparatus of claim 17 wherein said plurality of magnets are permanent magnets, and wherein said cover sheet and said permanent magnets are mounted on a backing plate.

19. An article conveying apparatus for conveying different types of force responsive articles, said apparatus comprising:

a conveyor for receiving the articles at a first position and discharging the articles at a second position with said conveyor effecting movement of the articles along a predetermined path between said first and second positions;

a first force provider adjacent to said conveyor, said first force provider providing a first force capable, when applied, of acting upon articles of a first one of the different types of articles on said predetermined path to maintain the articles of said first one of the different types of articles in engagement with said conveyor;

a second force provider adjacent to said conveyor, said second force provider providing a second force capable, when applied, of acting upon articles of a second one of the different types of articles on said predetermined path to maintain the articles of said second one of the different types of articles in engagement with said conveyor; and force adjusting units positionable adjacent to at least one of said first and second positions for adjusting the force applied to the articles to facilitate at least one of receiving and discharging of the articles.

20. The apparatus of claim 19 wherein said force adjusting units include shorting bars removably positioned adjacent to at least one of said first and second positions.

21. The apparatus of claim 20 wherein said shorting bars are spaced in a predetermined pattern to provide tapering of applied force to the articles.

22. A method for conveying different types of force responsive articles, said method comprising:

providing a movable surface capable of receiving different types of force responsive articles thereon with said movable surface having a width greater than that of the widthwise dimension of the articles received on said movable surface to enable widthwise spacing of the received articles across said movable surface;

establishing a first force capable, when applied, of acting upon articles of a first one of the different types of articles on said movable surface;

establishing a second force different in type from that of said first force and capable, when applied, of acting upon articles of a second one of the different types of articles on said movable surface; and moving said movable surface between first and second positions while applying at least one of said first and second forces to the articles on said movable surface to thereby maintain the articles in engagement with said movable surface regardless of the widthwise spacing of the articles on the movable surface whereby the articles are moved along with said movable surface while in engagement therewith.

23. The method of claim 22 wherein said method includes establishing a capability for application of magnetic and negative pressure forces as said first and second forces.

24. The method of claim 23 wherein the articles to be conveyed are different types of cans, and wherein said method further includes determining the type of can to be then conveyed and selecting the force to be applied dependent upon the type of can then to be conveyed.

25. The method of claim 24 wherein the different types of cans to be conveyed are aluminum and steel cans, wherein said magnetic force is selected for maintaining the steel cans in engagement with said movable surface, and wherein said negative pressure source is selected for maintaining the aluminum cans in engagement with said movable surface.

26. The method of claim 22 wherein said first and second positions between which the articles are to be conveyed are at different elevations, and wherein said method includes providing a movable surface that extends between said first and second positions at different elevations.

27. The method of claim 22 wherein said method also includes providing tapering of the applied force near at least one of said first and second positions between which the articles are to be conveyed.

28. The method of claim 27 wherein said tapering of said applied force includes application of shorting bars to adjust said force applied by at least one of said first and second forces.

29. The method of claim 28 wherein said application of said shorting bars includes applying said shorting bars in a predetermined pattern.

* * * * *